United States Patent [19]

Bühler et al.

[11] Patent Number: 4,858,140
[45] Date of Patent: Aug. 15, 1989

[54] NUMERICAL CONTROL SYSTEM FOR HIGHLY DYNAMIC PROCESSES

[75] Inventors: Ernst Bühler, Losone; Marco Boccadoro, Verscio, both of Switzerland

[73] Assignee: AG fur Industrielle, Losone Bei Locarno, Switzerland

[21] Appl. No.: 126,568

[22] Filed: Nov. 30, 1987

[30] Foreign Application Priority Data

Dec. 1, 1986 [DE] Fed. Rep. of Germany ....... 3640987

[51] Int. Cl.⁴ ..................... G05B 19/403; B23H 7/06
[52] U.S. Cl. ............................. 364/474.31; 318/573
[58] Field of Search ................. 364/474.31, 182, 702, 364/723, 853; 318/573

[56] References Cited

U.S. PATENT DOCUMENTS

| | | | |
|---|---|---|---|
| 3,538,315 | 11/1970 | Reuteler | 364/474.31 |
| 3,720,814 | 3/1973 | Klein | 364/474.31 |
| 4,034,192 | 7/1977 | Kishi et al. | 364/474.31 |
| 4,648,024 | 3/1987 | Kato et al. | 364/474.31 |
| 4,704,688 | 11/1987 | Kamata | 364/474.31 |

Primary Examiner—Allen MacDonald
Attorney, Agent, or Firm—Helfgott & Karas

[57] ABSTRACT

A coarse interpolator is adapted for use in a numerical control system for performing path interpolation calculations for the control of highly dynamic processes. These processess have different path contour geometries wherein a vector having a length L connects in linear form a first point P1 to a second point P2. These points are located in three dimensional Cartesian space having axes X, Y, and Z, Length L has Cartesian components X, Y and Z and is subject to an angular rotation C about the z axis. The interpolator responds to a group of predetermined vector lengths, starting with the maximum length, in order to calculate the path elements L, X, Y, Z and C for the maximum length vector. A path error E is then determined for the path elements so calculated. The error E is then compared with a praedetemined maximum error value. If the error E does not exceed the maximum value, the calculated path elements are outputted. If the error E exceeds the maximum value, the path elements for the vector which has the length next shorter to the vector of maximum length are then calculated. These operations are repeated until the path elements calculated for a vector result in a path error which does not exceed the maximum value and these path elements can be outputted. The distance between the outputted path elements and the end point of the path contour is then determined and the coarse interpolator stops interpolating when the distance has a zero value.

5 Claims, 3 Drawing Sheets

NUMERICAL CONTROL SYSTEM FOR HIGHLY DYNAMIC PROCESSES

CROSS REFERENCE TO COPENDING APPLICATION

The present application is related to copending application Ser. No. 126,267 filed on even date herewith.

BACKGROUND OF THE INVENTION

The present application related to numerical control system for highly dynamic processes. A control system for highly dynamic processes of the present type is disclosed in the book "Rechnersteurung von Fertigungseinrichtungen", R. Nann, ISW 4, Springer-Verlag, Berlin, Hidelberg, N.Y., 1972, pp 113–123.

In the known control system, a coarse interpolator, and a fine interpolator connected downstream thereof function in a predetermined time grid. The use of this fixed time grid by the coarse interpolator is disadvantageous when weakly curved contours are required since an inadequate node spacing is chosen. Consequently, the coarse interpolator produces an unnecessary data flood and is unnecessarily burdened with calculations of the nodes. Another disadvantage of use of the fixed time grid by the coarse interpolator becomes apparent when such a control system is used for controlling the path of a spark erosion machine. On working in a fixed time grid, the path end of a path contour is reached by a terminal path element, whose length normally varies greatly from the preceding path elements, so that there is a speed jump at the end of the path contour.

SUMMARY OF THE INVENTION

It is a primary object of the present invention to so further develop a numerical control system of the aforementioned type that, despite a high speed of the path elements obtained by coarse interpolation by the coarse interpolator, there is a reduction in the data quantity to be handled by the coarse interpolator.

A coarse interpolator, in accordance with the principles of the invention, is adapted for use in a numerical control system for performing path interpolation calculations for the control for highly dynamic processes. These processes have different path contour geometries wherein a vector having a length L connects in linear form a first point P1 to a second point P2. These points are located in three dimensional Cartesian space having axes x, y, and z. Length L has Cartesian components X, Y and Z and is subject to an angular rotation C about the z axis.

The interpolator responds to a group of predetermined vector lengths, starting with the maximum length, in order to calculate the path elements L, X, Y, Z and C for the maximum length vector. A path error E is then determined for the path elements so calculated. The error E is then compared with a predetermined maximum error value. If the error E does not exceed the maximum value, the calculated path elements are outputted. If error E exceeds the maximum value, the path elements for the vector which has the length next longest to the vector of maximum length are then calculated. These operations are repeated until the path elements calculated for a vector result in a path error which does not exceed the maximum value and these path elements can be outputted. The distance between outputted path elements and the end point of the path contour is then determined and the coarse interpolator stops interpolating when the distance has a zero value.

The coarse interpolator completely eliminates the time grid basis considered necessary in the prior art and instead of this produces the path elements or interpolation points as a function of the contour of the path. The burden of the coarse interpolator is greatly reduced by the geometry dependent data calculation.

When the distance difference between the instantaneous node and the end coordinates of the path or the final node of the path are checked, as explained below, rounding errors and calculating residuals are eliminated.

The foregoing as well as additional objectives and advantages of the invention will either be explained or will become apparent to those skilled in the art when this specification is read in conjunction with the brief description of the drawings and the detailed description of preferred embodiments which follow:

BRIEF DESCRIPTION OF THE DRAWINGS

FIG. 1 shows the two main components of the system, namely the fine interpolator 2 which reduces the geometry to the linear portions and transfers said reduced geometry together with further control information to the fine interpolator 2 and the fine interpolator 2, which can in turn report back informations concerning the system status, process status or the geometrical points reached on the coarse interpolator 1.

Figure 1:
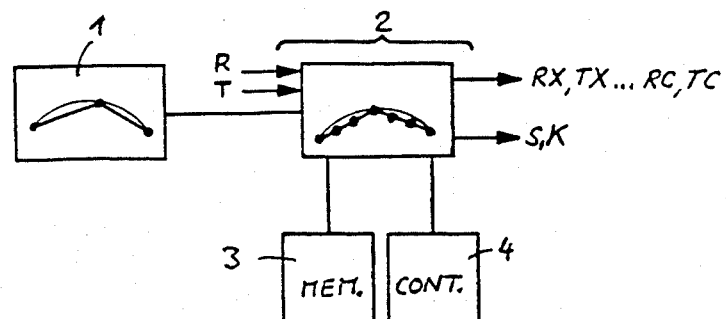
FIG. 1 is a block diagram of a numerical control system.

Fine interpolator 2 contains an intermediate store 3, which stores in ordered manner the informations from the coarse interpolator 1. This intermediate store 3 is normally equipped with random access memories (RAM).

The store capacity can readily be up to 1 Mbyte, i.e. one million 8 bit data words. The smallest construction has approximately 2 Kbyte and would be asynchronously reloaded from the coarse interpolator I in the case of long programs with the process running and after reporting back. This process can naturally also be performed blockwise forwards and backwards, so that it is always possible to interpolate back to the starting point.

The fine interpolator 2 also contains an autonomous control system 4, which essentially comprises a sequential control. The latter is activated by different control signals and, as a function of status signals, performs one of several preprogrammed control sequences. As a result of the latter, the fine interpolator receives one byte from the coarse interpolator 1, stores same at the address of the intermediate store 3 incremented by 1 and acknowledges the acceptance to the coarse interpolator 1. When the servopath frame clock signal T requires a new path increment, as a function of the servo-direction signal R a control sequence for forward or backward interpolation is activated. The sequence speed can be so high that microseconds following the servo-path frame clock signal T or even earlier, the axial outputs RX, TX, RY, TY, RZ, TZ, RC, TC have the correct path increments.

It is also possible to output process parameters S, K between two path increments. They can be stored at this point of the geometry in intermediate store 3, or can be outputted by the coarse interpolator 1 as a direct, manual command, which in turn triggers a corresponding control sequence. Process parameters S, K comprise an address S, which states which parameter of the system or process is to be modified, and a value K, which corresponds to the new setting of said parameter. Thus, without great wiring expenditure it is possible to control all the parameters via one bus and in each case one address decoder, which in the case of coincidence assumes the value K in a register.

Figure 2:
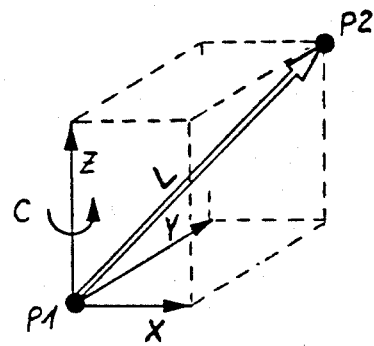
FIG. 2 is a representation of a four-axis spatial movement.

FIG. 2 shows an example of a four-axis controlled countersinking erosion machine in three-dimensional form, the path elements L, X, Y, Z, C, as outputted by the coarse interpolator I. A vector of length L connects in linear form space point P1 with space point P2 and, as explained hereinafter, never differs by more than one admissible path error E from the desired path.

This vector length L is subsequently the reference for the summation of the servo-path frame clock signals, so that a vector true speed of the system is guaranteed. The Cartesian axial components X, Y and Z, as well as the components for the rotation C about the Z-axis are also transferred to the fine interpolator and subsequently determine the division ratio in a programmable frequency divider 5. The number and nature of the axes can differ greatly from process to process. Thus, apart from the three principal axes X, Y, Z, spark-erosive wire cutting machines also have conical axes U and V. In addition, modern laser cutting machines have at least five axes, in order to be able to orient in an optimum manner the laser beam onto preshaped sheet metal parts.

Modern, inexpensive personal computers can rapidly and precisely perform mathematical floating point operations, provided that angle function are not required (e.g. sine, cosine or tangent). However, there are also digital signal processors and one chip floating point processors, which satisfy all requirements regarding the calculating speed of the basic operation. Thus, in 100 ns, new chips are able to perform a 32 bit floating point addition or multiplication. In the case of double precision (11 bit exponent, 52 bit mantissa) a floating point processor is able to perform all the basic operations and square roots in less than 8 $\mu$s, whilst e.g. a tangent function requires 30 $\mu$s.

Since many processors also have no angle function in the instruction set, a coarse interpolator not requiring these functions is very advantageous.

Figure 3:
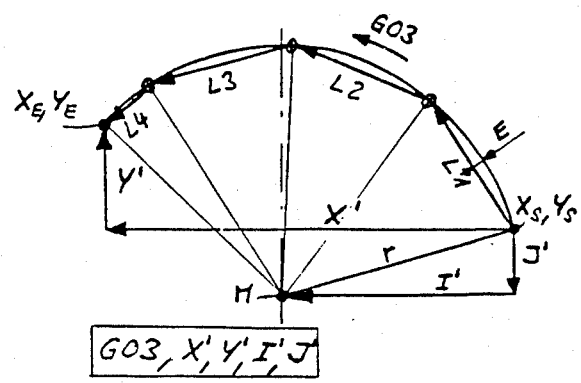
FIG. 3 is a representation of a circular coarse interpolation.
Figure 4:
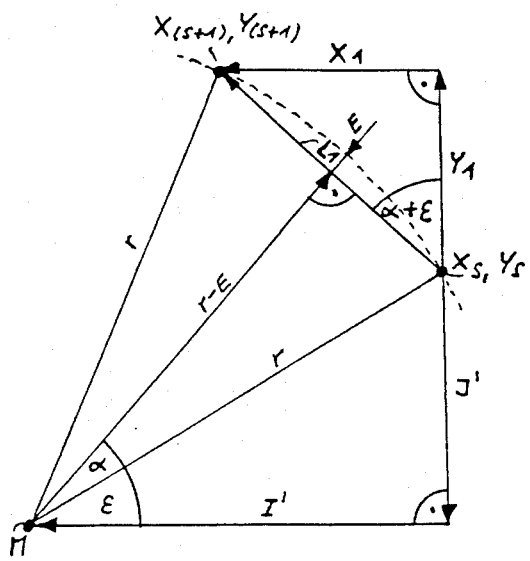
FIG. 4 is a representation explaining the calculation of the path error and the axial components for the circular coarse interpolation.

FIGS. 3 and 4 illustrate the principle of the coarse interpolation without angle functions. A circular piece is to be moved counterclockwise. Information is available e.g. according to DIN 66025 in ISO code, G03 meaning circular interpolation in the counterclockwise direction, X', Y', are the difference distances between the starting coordinates $X_S$, $Y_S$ and the center of the circle M. Angle $\epsilon$ is enclosed by the X-axis and the connecting line between the center of the circle M—starting coordinates $X_S$, $Y_S$. Angle $\alpha$ is enclosed by said connecting line and the perpendicular from center of circle M onto vector $L_1$.

In order that the fine interpolator 2 only has to interpolate linearly and only a minimum data quantity is produced, it is necessary to find a polygonal course $L_1$ ... $L_4$, which never differs by more than one error value E from a maximum of one admissible value with respect to the theoretical circle. This admissible error can e.g. be 1 um, or e.g. for destruction cuts where accuracy plays no part, can be much greater. For ease of understanding, vector notation is not used hereinafter.

The following procedure is adopted:
1. The radius of the circle (r) is determined:

$$r = \sqrt{I' * I' + J' * J'}$$

2. Over the right-angled triangle using angle $\alpha$ (in FIG. 4) it is possible to determine the maximum chord length L for a given error E:

$$L_1 = 2 * \sqrt{r * r - (r - E) * (r - E)}$$

3. With the aid of a stored list for the admissible values of $L_2$ which will be explained hereinafter, it is possible to select the next smaller, integral value of vector length L. As the vectors $_1$ ... $L_3$ are all of equal length, the aforementioned calculations only have to be performed once per geometrical set.

4. As the angle sum in triangles is always 180°, it is possible to prove that the angle between $L_1$ and $Y_1$ corresponds to the sum of $\alpha + \epsilon$. Thus $X_1 = L_1 * \sin(\alpha + \epsilon)$ and $Y_1 = L_1 * \cos(\alpha + \epsilon)$. After goniometric transformation $$\sin(\alpha + \epsilon) = \sin E * \cos\alpha + \cos\epsilon * \sin\alpha, \text{ and}$$
$$\cos(\alpha + \epsilon) = \cos * \cos\alpha - \sin\epsilon * \sin\alpha.$$

From FIG. 4 it follows that:

$$\sin\alpha = L_1/(2 * r), \quad \cos\alpha = 1 - E/r$$
$$\sin\epsilon = J'/r \quad \cos\epsilon = I'/r$$

Thus, the angle functions are eliminated and the sought axial components $X_1$ and $Y_1$ can be obtained as follows:

$$X_1 = L_1 (J'/r * (1 - E/r) + I'/r * L_1/(2 * r))$$
$$Y_1 = L_1 (I'/r * (1 - E/r) - J'/r * L_1/(2 * r))$$

Thus, only J' and I' are variables, whereas the residue per geometrical set is constant and only has to be calculated once, hence:

$$X_1 = J' * K_1 + I' * K_2 \quad K_1 = L_1 * (1 - E/R)/r$$
$$Y_1 = I' * K_1 - J' * K_2 \quad K_2 = L_1 * L_1/(2 * r * r)$$

5. Possible old rounding errors are now added to $X_1$ and $Y_1$ and the result is rounded off to an integer. The new rounding error is stored.

6. The first path elements $L_1$, $X_1$, $Y_1$ can be outputted to the fine interpolator 2.

7. The new difference distances to the end coordinates $X_E$ and $Y_E$ are calculated:

$$X\text{-axis} = X' - X_1 \quad Y\text{-axis} = Y' - Y_1$$

also the new circle center distance:

$$I_1 = I - X_1, \quad J_1 = J - Y_1.$$

8. The procedure according to 4 to 7 is now repeated until the end coordinates $X_E$, $Y_E$ can be obtained with a last vector length L admissible according to the table. In FIG. 3 this is e.g. $L_4$. Thus, at the most vector $L_4$ can be of the same length as $L_1$. If the table of admissible vector lengths L permits no direct jump, then the vector $L_4$ can be formed from two or more path elements L, X and Y. Various errors can be compensated with this terminal vector $L_4$, e.g. the last rounding error, the finite calculating precision of the processor used and the often disturbing overdetermination of the end coordinates $X_E$, $Y_E$ by the ISO code.

Figure 5:
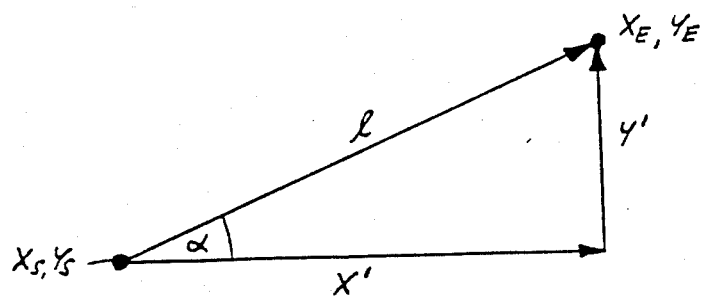
FIG. 5 is a representation of a linear coarse interpolation.
Figure 6:
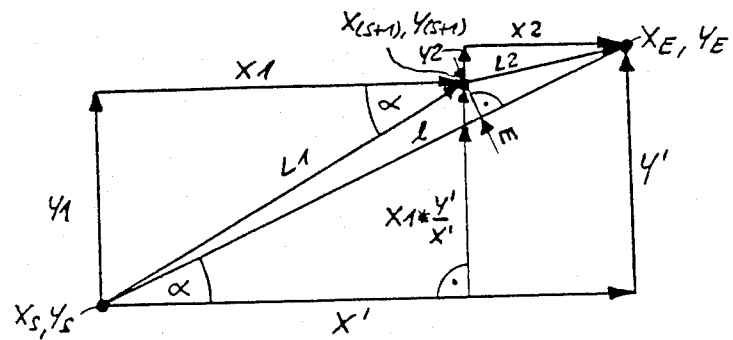
FIG. 6 is a representation for explaining the calculation of the path error and the axial components for the linear coarse interpolation.

The calculating methods for linear coarse interpolation are shown by FIGS. 5 and 6. In the ISO code, G01 stands for linear interpolation. X' and Y' are once again the difference distances between the starting coordinates $X_S$, $Y_S$ and the end coordinates $X_E$, $Y_E$.

Linear interpolation is a special case in that frequently geometrical sets occur which only relate to one axis. Through the limited valency of the fine interpolator 2 (cf. also D. Binder, p 114), it is appropriate to add a multiplication factor N to the path elements L, X, Y, Z, C, which determines how often a path element L, X, Y, Z, C is to be performed in fine interpolator 2, which leads to a further drastic reduction of the data quantity.

Assuming that in the X-direction it is necessary to interpolate 127.000 mm with a speed of only 10 mm/min and path increments of 1 um in the fixed time grid principle of 20 ms, a traditional coarse interpolator would produce a data flood of 38,100 path elements L, X, Y, Z, C, but with the proposed principle this can be dealt with by a single path element set N*L, X, Y, Z, C, if the fine interpolator is of the 7-digit type.

In the case of polyaxial movement and a small admissible path error E, the gain is admittedly smaller than in the above example, but because the data quantity is only geometry-dependent, the computer loading is always much smaller.

In FIG. 5, the theoretically required linear path is designated l and with X' includes the angle of inclination Thus, tangent $\alpha$ is Y'/X', cosine $\alpha$ is X'/l and sine $\alpha$ is FIG. 6 shows how the theoretical path l can be performed with e.g. two sets of path elements $L_1$, $X_1$, $Y_1$ and $L_2$, $X_2$, $Y_2$, the path error E being formed at the right angles to the theoretical path l. Thus, with a maximum $L_1$, the algorithm attempts to come close to end coordinates $X_E$, $Y_E$ From the outset only the vector lengths L admissible according to the stored table are used. The axial components $X_1$, $Y_1$ can then be calculated and can be rounded off to integral amounts fitting into the path frame. One obtains $X_1 = L_1 * X'/l$ and $Y_1 = L_1 * Y'/l$. It is finally necessary to clarify whether the path error E produced is smaller or equal to the admissible value, whereby E $(Y_1 - X_1*Y'/X')*Y'/l$. If path error (E) is too large, the entire calculation is repeated with the next smaller admissible vector length L, otherwise the first path elements $L_1$, $X_1$ and $Y_2$ are outputted to the fine interpolator 2.

The new distance difference to the end coordinates $X_E$, $Y_E$ is now calculated: X-axis=X'$X_1$ and Y-axis=Y'$-Y_1$ and the procedure is adopted until the distance difference becomes zero. The rounding errors and calculation residuals are automatically eliminated.

Axial components X, Y, Z, and C are divided by an optimized value by coarse interpolator 1 and rounded off.

For a seven-position fine interpolator 2, this value is equal to the vector length L divided by 128, 127.97 to 128.01 giving equally good results. This constant 128 can be determined experimentally or by computer simulation. The optimum value is that which gives the maximum number of admissible vector lengths L which for no axial component combinations X, Y, Z and C produce a final error caused by rounding off. If e.g. for the X-axis, 80 path increments were calculated by the coarse interpolator 1, then subsequently precisely 80 thereof must be outputted to axial output TX by the fine interpolator 2. For the mentioned example, there are 43 admissible vector lengths and the following table to be stored in the coarse interpolator 1 is obtained: 1 to 10 without gaps and then 12, 14, 15, 16, 17, 18, 20, 24, 28, 30, 31, 32, 33, 34, 36, 40, 48, 56, 60, 62, 63, 64, 65, 66, 68, 72, 80, 96, 112, 120, 124, 126, 127.

Following a brief analysis of these values, it can be seen that each vector length L between 1 and 127 can be combined from a maximum of two partial vectors.

Further information concerning the coarse interpolator and the numerical control system can be found in the aforementioned copending application which is incorporated by reference herein.

While the invention has been described with detailed reference to the drawings, it will be obvious to those skilled in the art that many modifications and changes can be made within the scope and sphere of the invention as defined in the claims which follow.

What is claimed is:

1. A course interpolator for use in a numerical control system for performing path interpolation calculations for the control of highly dynamic processes having different path contour geometries wherein a vector having a length L connects in linear form a first point P1 to a second point P2, these points being located in three dimensional Cartesian space having axes x, y, and z, length L having Cartesian components X, Y and Z and being subject to an angular rotation C about the z axis, said interpolator comprising:
   first means responsive to a group of predetermined vector lengths, starting with the maximum length, for calculating path elements L, X, Y, Z and C for a vector with the maximum length;
   second means for determining a path error E for the calculated path elements of the first means;
   third means for comparing the path error E with a predetermined maximum error value;
   fourth means, actuated when the path error E does not exceed the maximum error value, for outputting the calculated path elements; and
   fifth means, actuated when the path error E exceeds the maximum error value, for causing the first means to calculate the path elements for a vector which has the length next longest to said maximum length.

2. The coarse interpolator of claim 1 further including sixth means responsive to the outputted path elements for determining a distance therefrom to an end point of a path contour, and seventh means responsive to the sixth means for causing the coarse interpolator to stop interpolating when the distance has a zero value.

3. The coarse interpolator of claim 2, further including means for determining a group of lengths by simulation such that any two predetermined lengths of the vector when combined will yield a composite length falling within the range of 1 to 127.

4. A method for operating a coarse interpolator for use in a numerical control system for performing path interpolation calculations for the control of highly dynamic processes having different path contour geometries wherein a vector having a length L connects in linear form a first point Pl to a second point P2, these points being located in three dimensional Cartesian space having axes, x, Y, and z, length L having Cartesian components X, Y and Z and being subject to an angular rotation C about the z axis, said method comprising the steps of:

(a) calculating in response to a group of predetermined vector lengths, starting with the maximum length path elements L, X, Y, Z and C for a vector with a maximum length;

(b) determining a path error E for the calculated path elements produced by step (a);

(c) comparing the path error E determined by step (b) with a predetermined maximum error value;

(d) when the path error E does not exceed the maximum value, outputting the calculated path elements; and (e) when the path error E exceeds the maximum value, repeating steps (a), (b), and (c) in successive cycles with vectors being arranged in order of successively smaller lengths until step (d) can be carried out.

5. The method of claim 4, further including the step of determining in response to the outputted path elements a distance therefrom to an end point of a path contour and the step of causing in response to the step (e), at the coarse interpolator to stop interpolating when said distance has a zero value.

* * * * *